US012645789B2

(12) United States Patent
Gerasimov et al.

(10) Patent No.: US 12,645,789 B2
(45) Date of Patent: Jun. 2, 2026

(54) OUT-OF-DISTRIBUTION MODEL FOR LIVENESS DETECTION

(71) Applicant: UNICOTECH PORTUGAL, UNIPESSOAL LDA, Lisbon (PT)

(72) Inventors: Artem Gerasimov, Dubai (AE); Yury Litvinov, Almaty (KZ); Ivan Kryachko, Almaty (KZ); Bakai Zhamgyrchiev, Almaty (KZ); Svetlana Efimova, Dubai (AE)

(73) Assignee: UNICOTECH PORTUGAL, UNIPESSOAL LDA, Lisbon (PT)

( * ) Notice: Subject to any disclaimer, the term of this patent is extended or adjusted under 35 U.S.C. 154(b) by 173 days.

(21) Appl. No.: 18/533,839

(22) Filed: Dec. 8, 2023

(65) Prior Publication Data

US 2025/0190549 A1     Jun. 12, 2025

(51) Int. Cl.
| | |
|---|---|
| *G06F 21/55* | (2013.01) |
| *G06F 21/64* | (2013.01) |
| *G06N 20/00* | (2019.01) |
| *G06V 10/77* | (2022.01) |

(52) U.S. Cl.
CPC ............ *G06F 21/554* (2013.01); *G06F 21/64* (2013.01); *G06N 20/00* (2019.01); *G06V 10/77* (2022.01)

(58) Field of Classification Search
CPC ....... G06F 21/554; G06F 21/64; G06N 20/00; G06V 10/77
See application file for complete search history.

(56) References Cited

U.S. PATENT DOCUMENTS

| | | | |
|---|---|---|---|
| 8,554,703 B1 | 10/2013 | Lin et al. | |
| 2020/0175290 A1* | 6/2020 | Raja ...................... | G06N 3/045 |
| 2025/0166356 A1* | 5/2025 | Kakizaki ............. | G06V 10/761 |
| 2025/0182446 A1* | 6/2025 | Kakizaki ............. | G06V 10/761 |
| 2025/0190850 A1* | 6/2025 | Gerasimov ........... | G06N 20/00 |

FOREIGN PATENT DOCUMENTS

| | | |
|---|---|---|
| CN | 110532920 A | 12/2019 |
| CN | 114444705 A | 5/2022 |
| CN | 111598881 B | 7/2022 |
| WO | WO-2021191908 A1 | 9/2021 |

OTHER PUBLICATIONS

Feature Extraction By Using Deep Learning—A Survey (Year: 2018).*

* cited by examiner

*Primary Examiner* — Shirley X Zhang
(74) *Attorney, Agent, or Firm* — ESPE Legal Consultancy FZ-LLC

(57) ABSTRACT

Systems and methods for detecting a presentation attack. Datasets of original images and attack samples are used to train a model that creates in a feature space of samples of original images a set of elements corresponding to each sample. Elements form a limited set normalized to a disjoint set so that the boundary of the disjoint set divides the space of all possible collections of features into "legitimate" and "all others." "All others" include signs of known attacks, anomalies and signs of unknown attacks.

20 Claims, 6 Drawing Sheets

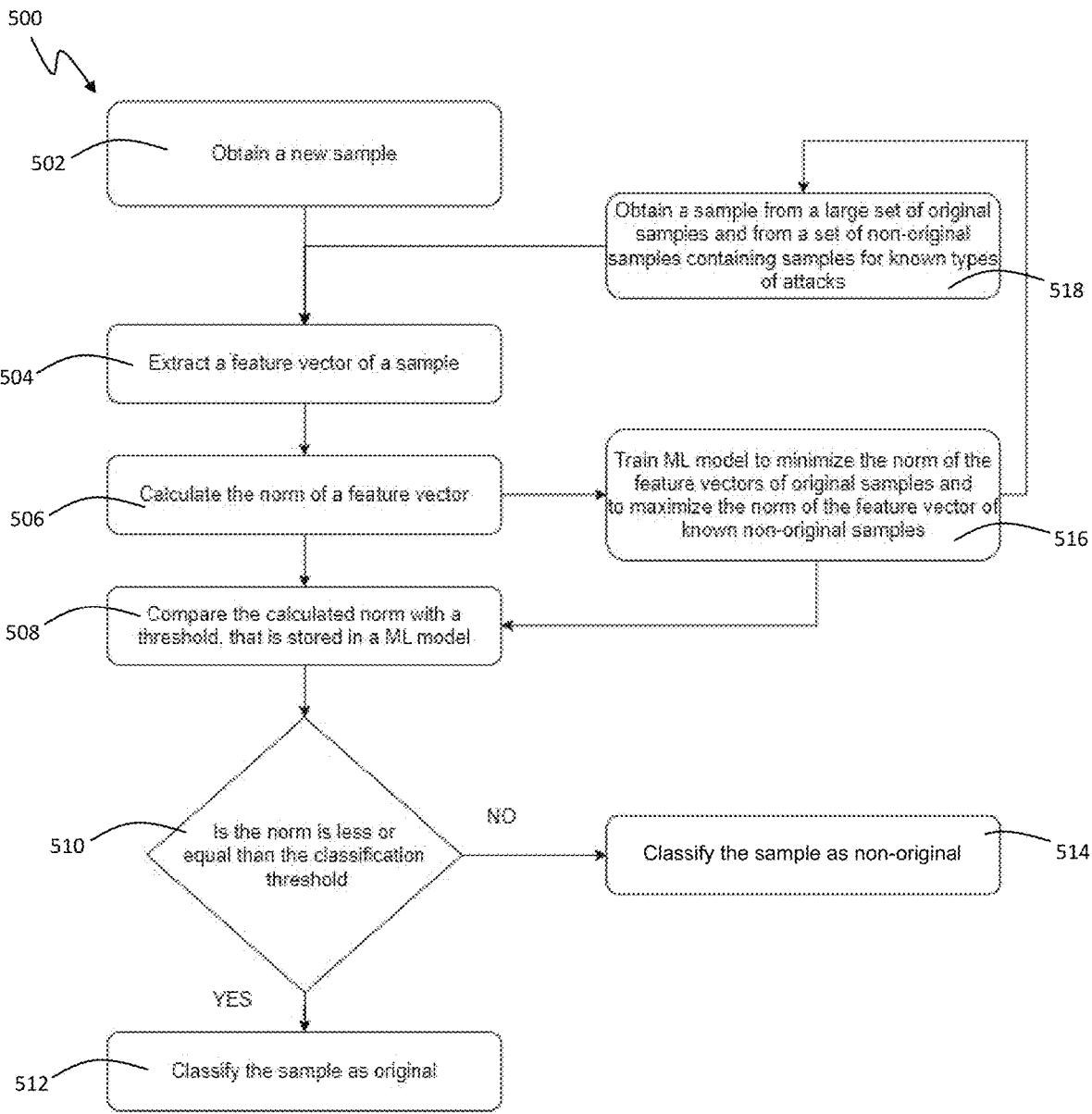

500

502  Obtain a new sample

518  Obtain a sample from a large set of original samples and from a set of non-original samples containing samples for known types of attacks 504  Extract a feature vector of a sample 516  Train ML model to minimize the norm of the feature vectors of original samples and to maximize the norm of the feature vector of known non-original samples 506  Calculate the norm of a feature vector 508  Compare the calculated norm with a threshold, that is stored in a ML model 510  Is the norm is less or equal than the classification threshold NO  514  Classify the sample as non-original

YES

512  Classify the sample as original

FIG. 5

600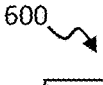

Train classifier machine learning model 602

Loop over batches of samples from the training data 604

Calculate model outputs for samples in batch 606

Calculate cumulative value of classification loss function for model outputs 608

Calculate gradients of loss function according to model parameters and learning rate 610

Extract feature vector for image sample with ML model 612

Calculate norm of feature vector with ML model 614

Map norm to score using mapping function 616

Determine image sample as original image or non-original image 618

FIG. 6

OUT-OF-DISTRIBUTION MODEL FOR LIVENESS DETECTION

TECHNICAL FIELD

The current invention relates generally to presentation attack detection. More particularly, the invention relates to presentation attack detection using machine learning models.

BACKGROUND

Biometrics can deliver a unique combination of high security and ease of use in applications that require identity authentication, such as access control, payments, or travel. A presentation attack is a "spoof" or "deep fake" or other subverting presentation to a biometric data capture subsystem with the goal of interfering with the operation of the biometric system.

An initial problem arises in the classification of whether a video or an image recorded for the purpose of biometric identification contains a real person or some kind of face-spoofing attack (presentation attack, deep fake etc.), and particularly classification of a type that was unknown at the time the system was designed.

Training of a threat detection model based on datasets of samples of original images and samples of fake images (attacks) can be utilized. However, in order to detect a threat with the required accuracy, it is necessary to compare the test sample with a set of good samples or their derivatives and a set of attack samples or their derivatives in a single feature space. A problem arises when a previously unknown technique for modifying or replacing an image is used for an attack.

In traditional solutions, a threat detection model can ignore features of the tested sample that will be used as characteristic of a certain verdict. For example, in a new type of attack that uses color correction and blurring of the original image (that was not previously used and, accordingly, is not typical for samples from the attack dataset), the model will generate an unpredictable verdict that is difficult to interpret, and the threat will be missed.

To solve this problem, various methods of modeling and synthesizing attacks are used, by generating images or modifying (augmenting) attack samples to increase the dataset and improve the quality of detection. However, this method is very labor-intensive and is limited by the set of techniques that can be used to build an extended dataset. Therefore, the accuracy of detecting unknown new threats using this method is still low, owing to the fundamental problem that the signs of an unknown attack cannot be predicted.

Therefore, there is a need for systems and methods that improve the quality of presentation attack detection in unknown attacks.

SUMMARY

Embodiments described or otherwise contemplated herein substantially meet the aforementioned needs of the industry.

In an embodiment, a system for detecting a presentation attack for an image sample comprises a training module configured to build and train a classifier machine learning model based on training data stored as image data, the training data including a set of original image samples and a set of non-original samples including samples for known types of attacks, wherein the training includes: looping over a plurality of batches of samples from the training data, such that for each batch: calculating the model outputs for the samples in the batch; calculating a cumulative value of a classification loss function for model outputs generated by the samples from the batch as a function of model parameters, calculating gradients of the loss function with respect to the model parameters, and updating the plurality of model parameters using the calculated gradients and a learning rate value; the machine learning model defined by at least: a feature extractor configured to extract a feature vector for the image sample, a norm calculator configured to calculate a norm of the feature vector, a norm to score mapping function configured to calculate a score from the norm, and a score classification threshold; and an inference module configured to execute the machine learning model and includes logic separate from the machine learning model to determine the image sample as associated with an original image when the score of the feature vector is less than or equal to the score classification threshold, or non-original image when the score of the feature vector is greater than the score classification threshold, wherein the image sample is of a previously unknown type.

In an embodiment, a method for detecting a presentation attack for an image sample comprises training a classifier machine learning model based on training data stored as image data, the training data including a set of original image samples and a set of non-original samples including samples for known types of attacks, wherein the training includes: looping over a plurality of batches of samples from the training data, such that for each batch: calculating the model outputs for the samples in the batch, calculating a cumulative value of a classification loss function for model outputs generated by the samples from the batch as a function of model parameters, calculating gradients of the loss function with respect to the model parameters and a learning rate value; extracting a feature vector for an image sample with the machine learning model; calculate a norm of the feature vector with the machine learning model; and mapping the norm to a score using a mapping function with the machine learning model; determining the image sample as associated with an original image when the score of the feature vector is less than or equal to the score classification threshold, or non-original image when the score of the feature vector is greater than the score classification threshold, wherein the sample is of a previously unknown type.

In an embodiment, a system for detecting a presentation attack, the system comprising: an attack detection module configured to configured to execute a machine learning model to determine an image sample as associated with an original image when a score of a feature vector is less than or equal to a score classification threshold, or non-original image when the score of the feature vector is greater than the score classification threshold, wherein the image sample is of a previously unknown type; the machine learning model defined by at least: a feature extractor configured to extract a feature vector for the image sample, a norm calculator configured to calculate a norm of the feature vector, and a norm to score mapping function configured to calculate a score from the norm.

In a feature and advantage of embodiments, systems and methods provide improved robustness in classification of whether a video or an image recorded for the purpose of biometric identification contains a real person or some kind of face spoofing attack (presentation attack, deep fake etc.).

In a feature and advantage of embodiments, systems and methods provide improved detection where previously unknown types of presentation attacks or complicated types of presentation attacks are used.

In a feature and advantage of embodiments, systems and methods provide real-time or nearly real-time correction of threat detection models to correct mistakes in production biometric systems.

In a feature and advantage of embodiments, systems and methods provide a threat detection model trained in an out-of-distribution (OOD) aware mode in order to handle unknown types of attacks. For example, a highly diverse and large dataset of originals can be used for training. In another example, known types of attacks are included in validation and testing datasets. In another example, embodiments of a threat detection model are trained to distinguish between "originals" (e.g. legitimate) and "everything else" (e.g. signs of known attacks, anomalies, and signs of unknown attacks).

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 5 is a flowchart of a method of processing a sample using a machine learning model, according to an embodiment.

FIG. 6 is a flowchart of a method for detecting a presentation attack for an image sample, according to an embodiment.

Figure 1:
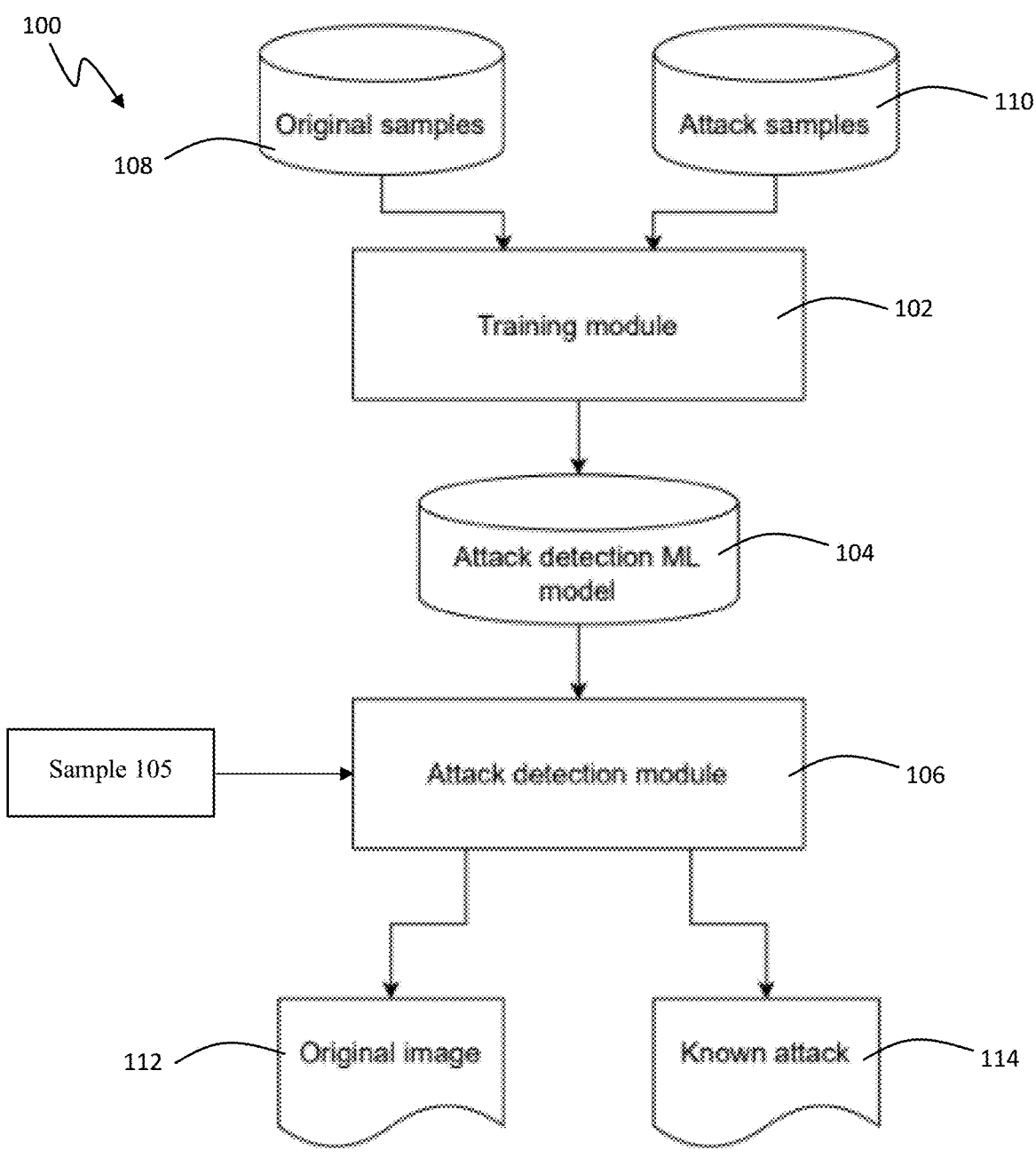
FIG. 1 is a block diagram of a system for presentation attack detection, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Systems and methods described herein use datasets of original images and attacks and their derivatives to train a model that creates in the feature space of samples a set of elements corresponding to each sample. In an embodiment, all elements form a limited set normalized to a sphere, so that the boundary of the set divides the space of all possible collections of features into "legitimate" and "all others." "All others" include signs of known attacks, anomalies and, most importantly, signs of unknown attacks. As described herein, "model" refers to a threat detection model or attack detection model. In an embodiment, training and testing use datasets of original images and known attacks to build the model. In an embodiment, for detection, the model relies only on a representation built from the original images.

If the features of the test sample in the feature space of the constructed model define the sample as an element that goes beyond the sphere boundary, this sample is defined as suspicious. In this case, the sample may not be an attack, but requires an enhanced analysis, such as by use of filters, special models and/or manual analysis. If the test sample is an attack, then the test sample is added to the dataset without updating the model. If the sample turns out to be the original image based on the results of detailed analysis, then the model is corrected by retraining or using additional models in a cascade or ensemble with the main model.

Converting the sample representation space into a spherical space allows for increased detection accuracy by training the model on big amount of samples corresponding to elements inside the sphere to the desired value. The dataset of original images is naturally replenished by users and various systems in the available collections.

As described herein, systems can include various engines or modules, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Referring to FIG. 1, a block diagram of a system 100 for presentation attack detection is depicted, according to an embodiment. System 100 generally comprises a training module 102, an attack detection machine learning model ("model") 104, and an attack detection module 106. FIG. 1 illustrates aspects of building an attack detection machine learning model and applying the attack detection machine learning model for a sample.

As described above, system 100 can be implemented on one or more computing devices. In particular, components of system 100, as described herein, can be implemented using a processor and an operably coupled memory.

The processor can accept digital data as input, and process the input according to instructions or algorithms, and provides results as outputs.

Memory can comprise volatile or non-volatile memory as required by the coupled processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Training module 102 is configured to build one or more machine learning models based on training data. For example, training module 102 can receive as inputs a plurality of original samples 108 and/or a plurality of attack samples 110 as training data and/or data for testing and/or validation. In an embodiment, plurality of original samples 108 includes original images. In an embodiment, plurality of attack samples 110 includes fake images.

Figure 2:
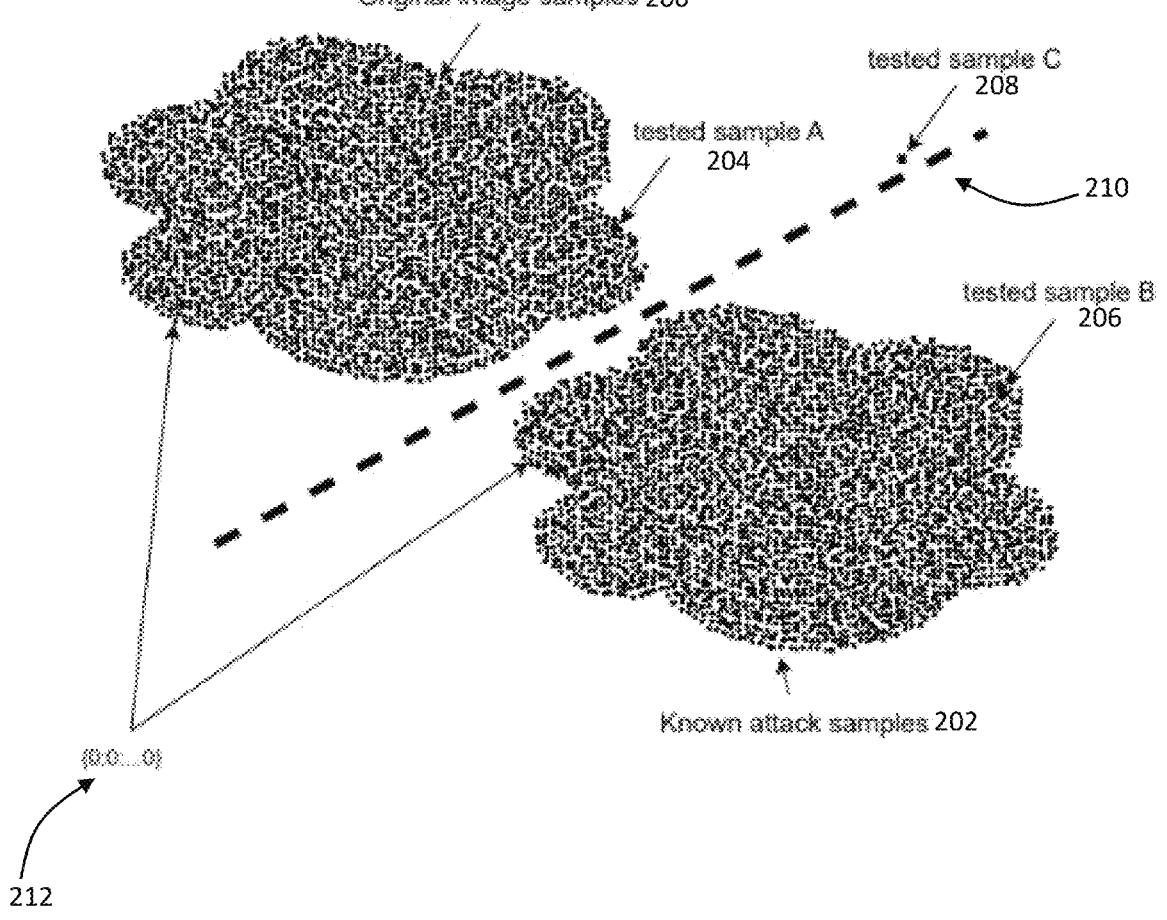
FIG. 2 is a diagram of multidimensional feature space for original image samples and known attack samples, according to an embodiment.

Plurality of original samples 108 and plurality of attack samples 110 can be stored in one or more databases. For example, as depicted in FIG. 2, system 100 comprises two databases for training data (e.g. 108 and 110). However, one skilled in the art will readily appreciate that additional or fewer databases can be utilized. In embodiments, the databases can each comprise simple non-volatile memory as part of a computer. In embodiments, the databases can each comprise database management systems such as ORACLE, IBM DB2, or MICROSOFT SQL SERVER, for example. In embodiments, each of the databases comprises a plurality of databases.

As depicted in FIG. 1, training module 102 can build model 104 using training data. Model 104 is a machine learning model trained based on plurality of original samples 108. In another embodiment model 104 is trained on a plurality of attack samples 110 Model 104 can be generated using an artificial neural network (ANN), decision tree, support-vector machine (SVM), regression analysis, Bayesian network, Gaussian process, generic algorithm (GA), or any other suitable machine learning system model.

In an embodiment, model 104 is configured to process sets of samples by extracting sets of characteristic features from the sets of samples in order to separate the elements of the collections representing the set of features of each sample into two disjoint sets. Accordingly, model 104 is trained and subsequently utilized to process additional data by attack detection module 106 to detect an attack. In embodiments, additional processing of samples with a ML model are described with respect to FIGS. 5-6.

In particular, attack detection module 106 is configured to use model 104 to analyze a sample 105. Specifically, attack detection module 106 can utilize the sets of characteristic features according to model 104 to classify sample 105. Attack detection module 106 is accordingly further configured to classify sample 105 as an original image 112 (no attack) or an attack 114, according to model 104. In embodiments, attack detection module 106 can also be referred-to as a classification module or inference module due to its operation of making a classification or inference using model 104.

Referring to FIG. 2, a diagram of multidimensional feature space for original image samples and known attack samples is depicted, according to an embodiment. For example, FIG. 2 depicts a representation of two disjoint sets.

In particular, FIG. 2 depicts the result of splitting the multidimensional feature space into two unlimited spaces, an original image samples space 200 and a known attack samples space 202. The set of elements (e.g. points) corresponding to the samples of the original images in original image samples space 200 are separated from the set of elements corresponding to known attacks in known attack samples space 202. In an embodiment, each point is a projection of a feature vector of a sample from a particular collection (illustrated by element 212).

In an embodiment, the feature vector is an n-dimensional vector of numerical features that describe the sample using pattern recognition.

In an embodiment, a model can be applied to test sample A 204, test sample B 206, and test sample C 208. In the example depicted, the model assigns each sample to a first or second set (original image samples space 200 or known attack samples space 202): sample A 204 is the original image, sample B 206 is fake, and sample C 208 is in a border zone 210. Formally, according to model 104, sample C 208 will also be classified as an original image in original image samples space 200, but the probability of error may be high.

Figure 3:
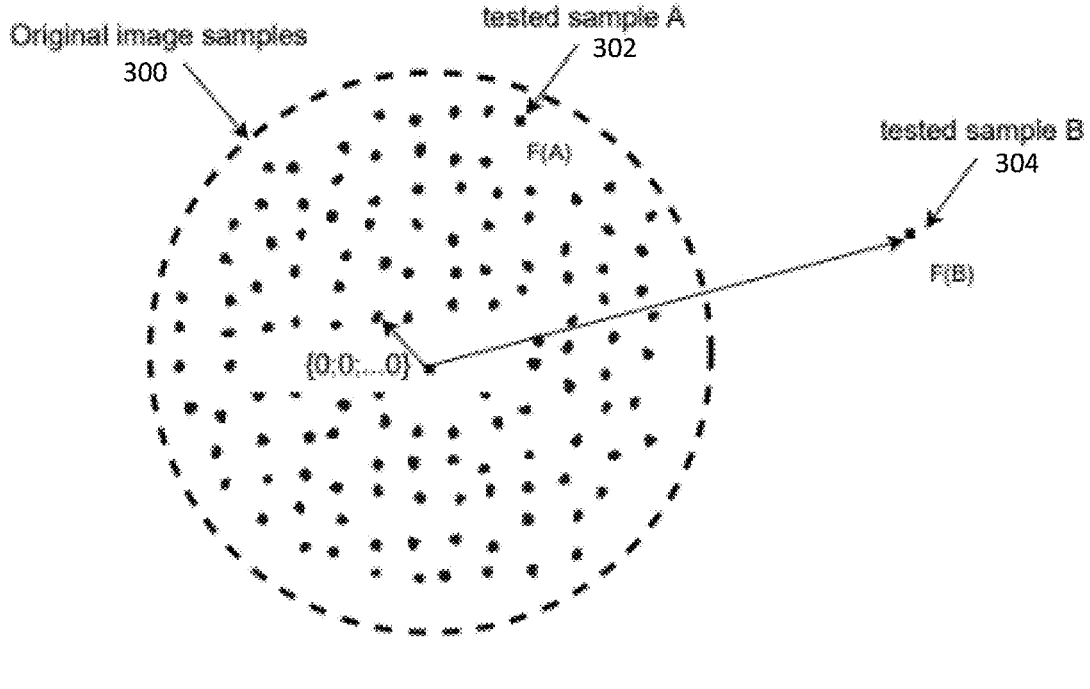
FIG. 3 is a diagram of multidimensional feature space for original image samples and known attack samples in a sphere, according to an embodiment.

Referring to FIG. 3, a diagram of multidimensional feature space for original image samples and known attack samples in a sphere is depicted, according to an embodiment. As illustrated, the multidimensional feature space includes two spaces: inside the sphere and outside the sphere. In contrast to FIG. 2, unknown types of attacks can be classified.

Referring to FIG. 3, original image samples 300 are depicted as inside the sphere. Unknown or attack samples are depicted as outside the sphere. In an example, tested sample A 302 according to F (A) of a model is determined to be an original image inside the sphere. Tested sample B 304 according to F (B) of a model is determined to be a non-original image outside the sphere. By expanding the dataset of original images, the accuracy of detecting original images is increased.

In an embodiment, in order to determine whether the test sample is an attack, an anomaly, or an incorrectly classified original image, the test sample is placed under continued evaluation. For example, if the tested sample B 304 is outside the sphere as in FIG. 3, tested sample B 304 is not verified as original.

As described herein, embodiments offer unified training of a model in order to detect both known attacks and unknown attacks with a significantly higher probability than existing solutions.

Figure 4:
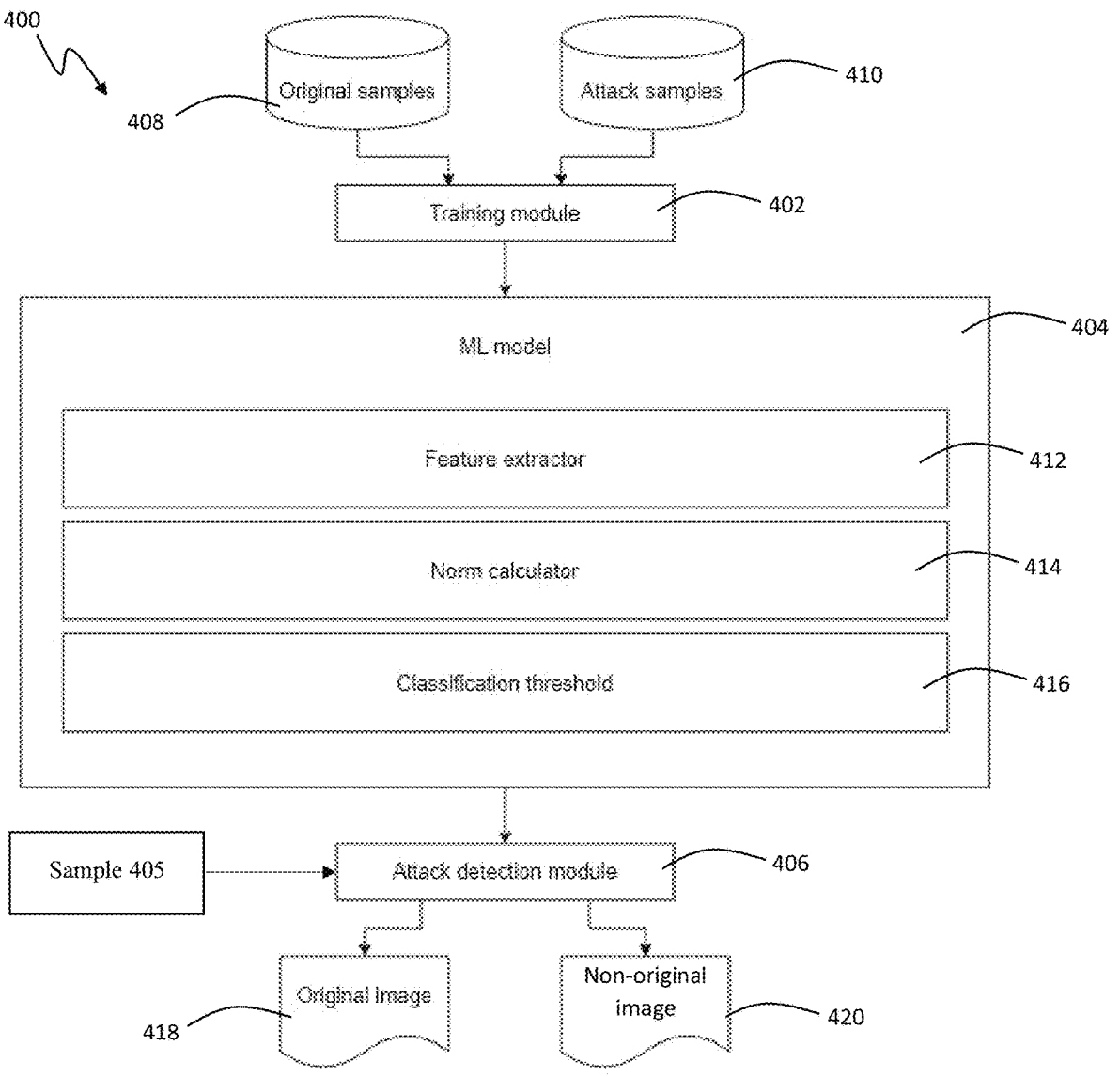
FIG. 4 is a block diagram of a sample processing subsystem using a machine learning model, according to an embodiment.

Referring to FIG. 4, a block diagram of a sample processing subsystem 400 using a machine learning model is depicted, according to an embodiment. In an embodiment, subsystem 500 includes a training module 402, a machine learning (ML) model 404, and an attack detection module (e.g. inference module) 406. FIG. 4 illustrates aspects of building an attack detection machine learning model and applying the attack detection machine learning model for a sample. In particular, FIG. 4 illustrates the process of building a model, (e.g. the arrows between training module 402, ML model 404, and attack detection module 406 depict the relative progress in the process of building a model for use by attack detection module 06).

In an embodiment, training module 402 is configured to build machine learning model 404 based on the training data. In an embodiment, training data can include a large set of original samples and a set of non-original samples containing samples for known types of attacks. For example, original samples database 408 can include a plurality of original samples such as image data samples. Attack samples database 410 can include a plurality of image data associated with one or more attacks. In an embodiment, attack samples database 410 includes fake images.

In an embodiment, ML model 404 includes a feature extractor 412, a norm calculator 414, and a classification threshold 416.

Feature extractor 412 is configured to extract or otherwise calculate a feature vector of a sample. For example, an image feature vector can be an abstraction of an image used to characterize and numerically quantify the contents of an image. In embodiments, real, integer, and/or binary values can be utilized. More particularly, a feature vector can include numbers to represent an image.

Norm calculator 414 is configured to calculate the norm of a feature vector. In an embodiment, then the norm or magnitude is defined as the length or magnitude of the vector. Accordingly, norm calculator 414 can determine the norm of one or more feature vectors calculated by feature extractor 412.

Classification threshold 416 can include a value against which the norm is compared. For example, a sample can be classified as original if the norm is less or equal than the classification threshold and as non-original otherwise. In an embodiment, the threshold value can be equal to "1": in this case the training module is configured to build a machine learning model 404, in which the norm of all original samples will be less or equal to 1, and the norm of all attack samples will be more than "1". In this embodiment, the machine learning model 404 will classify a test sample by comparing the norm of the test sample with 1: if it is less or equal to "1", then the test sample is an original image; if the norm of the test sample is more than "1" then the test sample is classified as a non-original image.

In an embodiment, attack detection module 406 is configured to execute ML model 404 (e.g. in production environments) to determine that a sample 405 is an original image 418 or a non-original image 420. Accordingly, classification or inference by attack detection module 406 using ML model 404 allows for the handling of any unknown type of non-original samples as non-original with significantly increased probability compared with traditional classifiers.

More particularly, ML model 404 is configured to process a sample including extracting a feature vector of a sample by utilizing feature extractor 412, calculating the norm of a feature vector utilizing norm calculator 414, and classifying the sample as original 418 if the norm is less or equal than the classification threshold 416 and as non-original otherwise (e.g. 420).

In an embodiment, training module 402 is configured to build ML model 404 to minimize the norm of the feature vectors of original samples and maximize the norm of the feature vector of known non-original samples. Referring to FIG. 5, a flowchart of a method 500 of processing a sample using a machine learning model is depicted, according to an embodiment. In an embodiment, method 600 can be implemented by, for example, system 100, or 400. Reference is made to subsystem 400 for illustration. FIG. 5 illustrates both model training and model application.

At 502, a new sample is obtained. For example, referring first to the training context, training module 402 can receive both original samples 408 and attack samples 410.

At 504, a feature vector is extracted from the image sample. For example, feature extractor 512 can calculate a feature vector of the image sample. Accordingly, the contents of an image can be numerically quantified.

At 506, the norm of the feature vector extracted at 504 can be calculated. For example, norm calculator 414 can calculate the norm (e.g. magnitude) of the vector.

At 516, from 506, the ML model can be trained to minimize the norm of the feature vectors of original samples and to maximize the norm of the feature vector of known non-original samples. For example, once norm calculator 414 has determined the norm of a given feature vector, that data can be utilized by training module 402 to train or retrain ML model 404. Such training therefore improves subsequent classifications (e.g. at 508-514).

At 518, from 516, a sample from a large set of original samples and from a set of non-original samples containing samples associated with known attacks can be obtained. For example, training module 402 can obtain original samples 408 and attack samples 410. Feature vector extraction at 504 and norm calculation 506 can likewise be made on such samples to train or retrain ML model 404.

Now referring to operations that apply the trained ML model 404, operations 502, 504, and 506 can likewise be applied for sample 405 (e.g. by ML model 404). At 508, the calculated norm from 506 is compared against a threshold of the ML model 404. For example, a classification threshold can be utilized as the threshold for comparison.

At 510, if the norm is less than or equal to the threshold, a classification of the sample as an original image is made at 512. However, if the norm is greater than the threshold at 510, a classification of the sample as a non-original image is made at 514. For example, ML model 404 can compare against the classification threshold. As ML model 404 is applied by attack detection module 406, classification can be as original image 418 (e.g. via 512) or non-original image or a non-original image 420 (e.g. via 514).

Referring to FIG. 6, a flowchart of a method 600 for detecting a presentation attack for an image sample is depicted, according to an embodiment. In an embodiment of a system implementing method 600, the system comprises a training module configured to build and train a classifier machine learning model based on training data, the machine learning model, and an inference module configured to execute the machine learning model.

At 602, a classifier machine learning model is trained based on training data stored as image data. In an embodiment, the training data includes a set of original image samples and a set of non-original samples including samples for known types of attacks. In an embodiment, the set of original image samples is a large data set, such that the large data set is sufficient to reflect a diversity of data for a task under consideration.

In an embodiment, training a classifier machine learning model at 602 can comprise a plurality of sub-operations.

At 604, a plurality of batches of samples of the training data is looped through.

At 606, the model outputs for the samples in the batch are calculated.

At 608, a cumulative value of a classification loss function for model outputs generated by the samples from the batch as a function of model parameters is calculated. In an embodiment, a loss function can include a stochastic gradient descent algorithm. In embodiments, any other optimizer, e.g., Adam, RMSProp, may be used instead of a stochastic gradient descent algorithm.

At 610, a plurality of gradients of the loss function with respect to the model parameters and a learning rate value are calculated. In a general embodiment, the learning rate value is defined according to:

$$new\_parameter\_value = old\_parameter\_value -$$
$$gradient\_with\_respect\_to\_current\_parameter * learning\_rate.$$

In other words, a learning rate determines the pace of the learning process. For example, a model outputs a feature vector (e.g. a high dimensional vector of floating point numbers x_1, . . . , x_N). Next, a loss function is a function that is calculated using the prediction(s) of the model for the batch and the ground truth class (original or attack) of the samples from the batch. In general, the loss function estimates the quality of model prediction. If the loss function value is small, the prediction quality is good. If the loss function value is high, the prediction quality is poor. The ultimate goal of the training process is to obtain the model parameters values that minimize the loss function value. During training, a loss function for each batch is calculated from the ground truth values for the samples from the batch and the model predictions. Respectively, model predictions depend on the model parameters and the samples themselves. Accordingly, the loss function for the batch is treated as a function of the model parameters. Gradients are being taken with respect to the model parameters. Here, gradients refer to derivatives. Gradients are used to obtain the direction that should be used to change the model parameters values to obtain a lower value of the loss function. Thus, the learning rate actually determines the value or in other words, the step of the changes.

In an embodiment, training the machine learning model is conducted to minimize the norm of the feature vector of original image samples during training of the machine learning model and maximize the norm of the feature vector of known non-original samples. For example, a base model is chosen to generate feature vectors. In an embodiment, the base model prediction (estimation of the class of the sample) is calculated. A relatively small value of the norm leads to a verdict that the sample is original, and a relatively greater value of the norm leads to the verdict that the sample is an attack. Accordingly, during the training process, the model is tuned to produce feature vectors with the small norm value for original image samples and feature vectors with large norm for attacks.

At 612, a feature vector for an image sample is extracted using the machine learning model. In an embodiment, the feature vector is extracted using any number of any machine learning model architecture that is capable of producing a feature vector for the image. In an embodiment, a convolutional neural network (CNN) can be used (e.g. ResNet, MobileNet, EfficientNet). In an embodiment, a transformer architecture can be used (e.g. DeIT, ViT, or CrossViT). In other embodiments, other suitable artificial neural network architectures can be utilized.

At 614, a norm of the feature vector is calculated using the machine learning model. In an embodiment, the norm is calculated according to an L2 of the feature vector, according to:

$$N(x_1, \dots, x_n) = \sqrt{\sum_{i=1}^{i=n} x_i^2}$$

At 616, the norm is mapped to a score using a mapping function using the machine learning model. In an embodiment, the score s is calculated from the norm N according to the norm to a score mapping function:

$$s(N) = 1 - e^{\frac{N^2}{\sigma}},$$

where $\sigma$ is a parameter of the algorithm and is selected for each task. For example, some fraction (e.g. $\frac{1}{10}$) of the feature vector dimensionality can be utilized for $\sigma$. In an embodiment, a default value for $\sigma=128.0$.

In embodiments, the norm to score mapping function generates a score as a floating point value in a range of [0, 1]. While a specific mapping function is described herein by way of example, any monotonic function that maps positive numbers into a [0, 1] interval can be used.

At 618, the image sample is determined to be associated with an original image when the score of the feature vector is less than or equal to the score classification threshold, or a non-original image when the score of the feature vector is greater than the score classification threshold, wherein the sample is of a previously unknown type. In an embodiment, the score classification threshold is associated with a required false acceptance rate (FAR) and a required false rejection rate (FRR). In a further example, the norm classification threshold can be an optimal threshold determined as optimal according to a tradeoff between the FAR and the FRR.

In an embodiment, classifier output is a score, such as a number in the range [0, 1]. If the number is zero, then the model is absolutely sure that the sample is an original. If the number is one, the model is absolutely sure that the sample is an attack. Intermediate values reflect uncertainty of the model. Typically, for a well trained model, a score for the majority of the original would be close to zero. Similarly, for attacks, a majority of the scores for attacks would be close to one. However, in some instances, the scores may not be as clearly separated. Accordingly, the threshold can be tuned.

The final verdict (original or attack) is determined by a predefined threshold value. If the score is less than the threshold, then the verdict is "original," and if the score is more than the threshold, the verdict is "attack." The value of the threshold can be tuned to adopt to the task at hand. For example, if the threshold value is selected to be very very small, it will lead to the very small FAR value, but maybe unacceptably high FRR. And vice versa: if the threshold value is selected to be close to one, a high value for FAR will result, but the FRR would be very low. Typically, embodiments can implement two strategies. In a first strategy, to minimize the cumulative error rate, it may be proven that it would be achieved at the threshold value, where FAR=FRR. In that case, cumulative error rate is called equal error rate (EER). In a second strategy, the maximum threshold that leads to some predefined acceptable FAR value is selected, which is then used to obtain FRR.

The invention claimed is:

1. A system for detecting a presentation attack for an image sample, the system comprising:

at least one processor operably coupled to memory;

instructions that, when executed by the at least one processor, cause the at least one processor to implement:

a training module configured to build and train a classifier machine learning model based on training data stored as image data, the training data including a set of original image samples and a set of non-original samples including samples for known types of attacks, wherein the training includes:

looping over a plurality of batches of samples from the training data, such that for each batch:

calculating the model outputs for the samples in the batch;

calculating a cumulative value of a classification loss function for model outputs generated by the samples from the batch as a function of model parameters, calculating gradients of the loss function with respect to the model parameters, and updating the plurality of model parameters using the calculated gradients and a learning rate value;

the machine learning model defined by at least:

a feature extractor configured to extract a feature vector for the image sample, a norm calculator configured to calculate a norm of the feature vector, wherein the norm is a scalar magnitude of the feature vector for the image sample, the image sample comprising a single image sample, a norm to score mapping function configured to calculate a score from the norm, wherein the score comprises a confidence value for a single image sample independent of other image samples, and a score classification threshold; and an inference module configured to execute the machine learning model and includes logic separate from the machine learning model to determine the image sample as associated with an original image when the score of the feature vector is less than or equal to the score classification threshold, or non-original image when the score of the feature vector is greater than the score classification threshold, wherein the image sample is of a previously unknown type, and wherein the association with an original image or a non-original image uses a spherical feature-space in which original image samples are distributed within a bounded region of the spherical feature-space, and non-original or anomalous samples fall outside the bounded region of the spherical feature-space.

2. The system of claim 1, wherein the training module is configured to train the machine learning model to minimize the norm of the feature vector of original image samples during training of the machine learning model and maximize the norm of the feature vector of known non-original samples.

3. The system of claim 1, wherein the set of original image samples is a large data set, wherein the large data set is sufficient to reflect a diversity of data for a task under consideration.

4. The system of claim 1, wherein the feature extractor is built using at least one of ResNet, MobileNet, EfficientNet, DeIT, ViT, or Cross ViT.

5. The system of claim 1, wherein the score classification threshold is associated with a required false acceptance rate (FAR) and a required false rejection rate (FRR).

6. The system of claim 5, wherein the norm classification threshold is an optimal threshold is determined as optimal according to a tradeoff between the FAR and the FRR.

7. The system of claim 1, wherein the norm is calculated according to an L2 of the feature vector, according to:

$$N(x_1, \ldots, x_n) = \sqrt{\sum_{i=1}^{i=n} x_i^2} \,.$$

8. The system of claim 1, wherein the score s is calculated from the norm N according to the norm to score mapping function:

$$s(N) = 1 - e^{\frac{N^2}{\sigma}}$$

where $\sigma$ is a parameter of the algorithm is selected for each task.

9. The system of claim 1, wherein the norm to score mapping function generates a score as a floating point value in a range of 0 to 1.

10. A method for detecting a presentation attack for an image sample, the method comprising:

training a classifier machine learning model based on training data stored as image data, the training data including a set of original image samples and a set of non-original samples including samples for known types of attacks, wherein the training includes:

looping over a plurality of batches of samples from the training data, such that for each batch:

calculating the model outputs for the samples in the batch, calculating a cumulative value of a classification loss function for model outputs generated by the samples from the batch as a function of model parameters, calculating gradients of the loss function with respect to the model parameters and a learning rate value;

extracting a feature vector for an image sample with the machine learning model;

calculate a norm of the feature vector with the machine learning model, wherein the norm is a scalar magnitude of the feature vector for the image sample, the image sample comprising a single image sample; and mapping the norm to a score using a mapping function with the machine learning model, wherein the score comprises a confidence value for a single image sample independent of other image samples;

determining the image sample as associated with an original image when the score of the feature vector is less than or equal to the score classification threshold, or non-original image when the score of the feature vector is greater than the score classification threshold, wherein the sample is of a previously unknown type, and wherein the association with an original image or a non-original image uses a spherical feature-space in which original image samples are distributed within a bounded region of the spherical feature-space, and non-original or anomalous samples fall outside the bounded region of the spherical feature-space.

11. The method of claim 10, wherein training the machine learning model minimizes the norm of the feature vector of original image samples during training of the machine learning model and maximizes the norm of the feature vector of known non-original samples.

12. The method of claim 10, wherein the set of original image samples is a large data set, wherein the large data set is sufficient to reflect a diversity of data for a task under consideration.

13. The method of claim 10, wherein the feature vector is extracted using at least one of ResNet, MobileNet, Efficient-Net, DeIT, ViT, or CrossViT.

14. The method of claim 10, wherein the score classification threshold is associated with a required false acceptance rate (FAR) and a required false rejection rate (FRR).

15. The method of claim 14, wherein the norm classification threshold is an optimal threshold is determined as optimal according to a tradeoff between the FAR and the FRR.

16. The method of claim 10, wherein the norm is calculated according to an L2 of the feature vector, according to:

$$N(x_1, \dots, x_n) = \sqrt{\sum_{i=1}^{i=n} x_i^2}.$$

17. The method of claim 10, wherein the score s is calculated from the norm N according to the norm to score mapping function:

$$s(N) = 1 - e^{\frac{N^2}{\sigma}}$$

where $\sigma$ is a parameter of the algorithm and is selected for each task.

18. The method of claim 10, wherein the norm to score mapping function generates a score as a floating point value in a range of 0 to 1.

19. A system for detecting a presentation attack, the system comprising:

at least one processor operably coupled to memory;

instructions that, when executed by the at least one processor, cause the at least one processor to implement:

an attack detection module configured to configured to execute a machine learning model to determine an image sample as associated with an original image when a score of a feature vector is less than or equal to a score classification threshold, or non-original image when the score of the feature vector is greater than the score classification threshold, wherein the image sample is of a previously unknown type, and wherein the association with an original image or a non-original image uses a spherical feature-space in which original image samples are distributed within a bounded region of the spherical feature-space, and non-original or anomalous samples fall outside the bounded region of the spherical feature-space;

the machine learning model defined by at least:

a feature extractor configured to extract a feature vector for the image sample, a norm calculator configured to calculate a norm of the feature vector, wherein the norm is a scalar magnitude of the feature vector for the image sample, the image sample comprising a single image sample, and a norm to score mapping function configured to calculate a score from the norm, wherein the score comprises a confidence value for a single image sample independent of other image samples.

20. The system of claim 19, further comprising a training module configured to train the machine learning model including by:

looping over a plurality of batches of samples from training data, such that for each batch:

calculating the model outputs for the samples in the batch, calculating a cumulative value of a classification loss function for model outputs generated by the samples from the batch as a function of model parameters, and calculating gradients of the loss function with respect to the model parameters and a learning rate value.

* * * * *